(12) United States Patent
Steinberg

(10) Patent No.: US 12,038,375 B2
(45) Date of Patent: Jul. 16, 2024

(54) SYSTEM AND METHOD FOR SYNCHRONIZED STAGE MOVEMENT

(71) Applicant: THERMO ELECTRON SCIENTIFIC INSTRUMENTS LLC, Madison, WI (US)

(72) Inventor: Peter Steinberg, Madison, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 98 days.

(21) Appl. No.: 17/830,327

(22) Filed: Jun. 1, 2022

(65) Prior Publication Data

US 2022/0390359 A1    Dec. 8, 2022

Related U.S. Application Data

(60) Provisional application No. 63/196,009, filed on Jun. 2, 2021.

(51) Int. Cl.
*G01N 21/35* (2014.01)
*G01J 3/45* (2006.01)
*G02B 21/00* (2006.01)

(52) U.S. Cl.
CPC ............. *G01N 21/35* (2013.01); *G01J 3/45* (2013.01); *G02B 21/0036* (2013.01); *G01N 2021/3595* (2013.01); *G01N 2201/021* (2013.01)

(58) Field of Classification Search
None
See application file for complete search history.

(56) References Cited

U.S. PATENT DOCUMENTS

| | | | | |
|---|---|---|---|---|
| 4,653,878 A | * | 3/1987 | Nakasato | G02B 21/26 359/392 |
| 5,008,606 A | * | 4/1991 | Koehler | G01J 3/4535 244/17.27 |
| 2003/0019310 A1 | * | 1/2003 | Hasegawa | G02B 21/26 74/89.22 |
| 2004/0222378 A1 | | 11/2004 | Carter et al. | |
| 2006/0119856 A1 | | 6/2006 | Koshoubu | |

(Continued)

FOREIGN PATENT DOCUMENTS

WO    99/40413    8/1999

OTHER PUBLICATIONS

Rammelsberg R et al: Set-Up for Time-Resolved Step-Scan FTIR Spectroscopy of Noncyclic Reactions; Vibrational Spectroscopy, Elsevier Science, Amsterdam, vol. 19, Feb. 1, 1999, pp. 143-149.

(Continued)

*Primary Examiner* — Marcus H Taningco

(57) ABSTRACT

An embodiment of a microscope system is described that comprises a sample stage configured to position a sample; and a spectrometer comprising an interferometer configure to provide a light beam to the sample stage and one or more detectors configured to detect light spectra in response to the light beam, wherein the spectrometer sends a notification to the sample stage after a scan comprising an acceptable measure of quality has been acquired from the detected light spectra at a first location, and the sample stage is further configured to count the notifications and initiate movement of the sample stage to a second location when a count value reaches a pre-determined number.

22 Claims, 3 Drawing Sheets

(56) References Cited

U.S. PATENT DOCUMENTS

| | | | |
|---|---|---|---|
| 2012/0194903 A1* | 8/2012 | Nishikawa | G02B 21/26 359/385 |
| 2016/0091366 A1* | 3/2016 | Yang | G01J 3/0237 356/301 |
| 2018/0307027 A1* | 10/2018 | Yokota | G02B 21/367 |

OTHER PUBLICATIONS

EP Search Report Issued Oct. 11, 2022 for EP Application Non. 22173861.0.

* cited by examiner

SYSTEM AND METHOD FOR SYNCHRONIZED STAGE MOVEMENT

CROSS-REFERENCE TO RELATED APPLICATIONS

This application claims priority to U.S. provisional patent application Ser. No. 63/196,009, filed Jun. 2, 2021, entitled SYSTEM AND METHOD FOR SYNCHRONIZED STAGE MOVEMENT, which is incorporated herein by reference in their entireties

FIELD OF THE INVENTION

The present invention is generally directed to a system and method enabled to minimize the amount of time needed to collect an image.

BACKGROUND

It is generally appreciated that Fourier transform infrared (FTIR) interferometric spectrometers are widely used in the analysis of chemical compounds. By measuring the absorption of infrared radiation by an unknown sample at various wave lengths in the infrared spectrum and comparing the results with known standards, these instruments generate useful information with respect to the chemical makeup of the unknown sample. In one example of an FTIR spectrometer, infrared radiation from an infrared emitting source is passed through an interferometer (e.g. a Michelson type interferometer) to a sample to be analyzed, and light spectra from the sample is brought to focus on an infrared detector. The interferometer system, in combination with the sample, modulates the intensity of the infrared radiation that impinges on the detector, and thereby forms a time variant intensity signal. It is the function of the detector to convert this time variant intensity signal to a corresponding time varying current. The current, in turn, is converted to a time varying voltage, which is presented to an analog-to-digital converter and then stored as a sequence of digital numbers to be processed in a processor associated with the spectrometer. Examples of FTIR spectrometer systems are described in U.S. Pat. Nos. 7,440,095 and 7,496,220, each of which is hereby incorporated by reference herein in its entirety for all purposes.

It is also generally appreciated that there have been numerous efforts to increase the speed of image acquisition that is particularly important for large images that include taking data from several positions on a sample. For example, the interferometer may continuously collect data on what is generally referred to as a "forward sweep" and a "reverse sweep". Alternatively, the interferometer may only collect data during one sweep while performing other operations during the other sweep. In some cases, these other operations have included translation of a sample stage during the period of the sweep (e.g. may also include a period of time for what is generally referred to as the mirror turn around operation).

While the earlier efforts were generally successful to increase the speed of image acquisition, the desire for further improvement and/or simplicity continues to exist. Therefore, there continues to be a need for a configuration of FTIR spectrometer system that provides an alternative that efficiently and quickly acquires images from multiple locations on a sample.

SUMMARY

Systems, methods, and products to address these and other needs are described herein with respect to illustrative, non-limiting, implementations. Various alternatives, modifications and equivalents are possible.

An embodiment of a microscope system is described that comprises a sample stage configured to position a sample; and a spectrometer comprising an interferometer configure to provide a light beam to the sample stage and one or more detectors configured to detect light spectra in response to the light beam, wherein the spectrometer sends a notification to the sample stage after a scan comprising an acceptable measure of quality has been acquired from the detected light spectra at a first location, and the sample stage is further configured to count the notifications and initiate movement of the sample stage to a second location when a count value reaches a pre-determined number.

In some cases, the light spectra is detected from a sample disposed on the sample stage and may include an emission spectra or a transmission spectra. Also, the acceptable measure of quality may include successful collection of data using a specified set of parameters.

In some applications, the sample stage may be further configured to send a notification to the spectrometer when the count value reaches a pre-determined number, and in some instances the spectrometer may be configured to stop data collection upon receipt of the notification. Further, the sample stage may be further configured to send a notification to the spectrometer when the sample stage is positioned at the second location, and in some cases the spectrometer is configured to start data collection upon receipt of the notification.

The movement of the sample stage may also occur during a reverse sweep of the interferometer.

An embodiment of a method of moving a sample stage is described that comprises providing a light beam to the sample stage from a spectrometer; detecting light spectra in response to the light beam using the spectrometer; sending a notification from the spectrometer to the sample stage after a scan comprising an acceptable measure of quality has been acquired from the detected light spectra at a first location, wherein the sample stage counts the notifications; and initiating movement of the sample stage to a second location when a count value reaches a pre-determined number.

In some cases, the light spectra is detected from a sample disposed on the sample stage and may include an emission spectra or a transmission spectra. Also, the acceptable measure of quality may include successful collection of data using a specified set of parameters.

In some applications, the sample stage may be further configured to send a notification to the spectrometer when the count value reaches a pre-determined number, and in some instances the spectrometer may be configured to stop data collection upon receipt of the notification. Further, the sample stage may be further configured to send a notification to the spectrometer when the sample stage is positioned at the second location, and in some cases the spectrometer is configured to start data collection upon receipt of the notification.

The movement of the sample stage may also occur during a reverse sweep of the interferometer.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 110 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention include a system and method that minimizes the amount of time needed to collect an image by synchronizing the movement of a sample stage to a period that a spectrometer instrument does not actively collect data from a sample.

Figure 1:
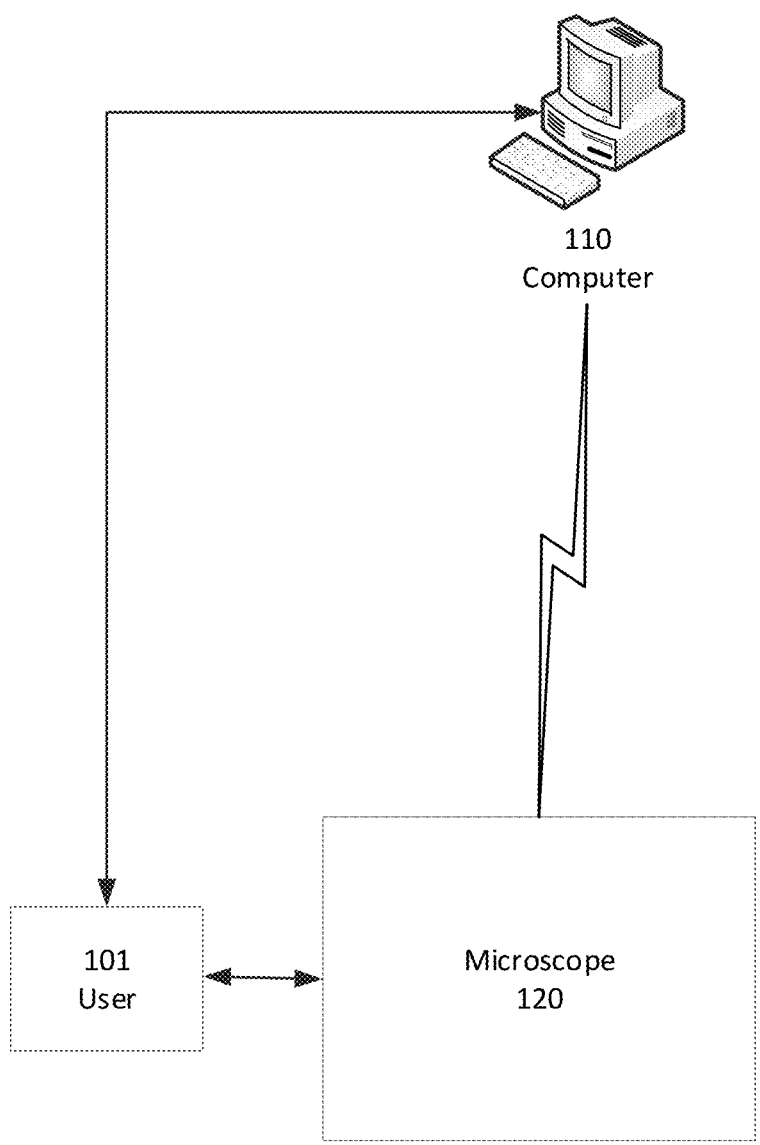
FIG. 1 is a functional block diagram of one embodiment of a microscope instrument in communication with a computer.

FIG. 1 provides a simplified illustrative example of user 101 capable of interacting with computer 110 and microscope 120. Embodiments of microscope 120 may include a variety of commercially available microscopes. For example, microscope 120 may include the Nicolet iN10 Infrared microscopes available from Thermo Fisher Scientific. FIG. 1 also illustrates a network connection between computer 110 and microscope 120, however it will be appreciated that FIG. 1 is intended to be exemplary and additional or fewer network connections may be included. Further, the network connection between the elements may include "direct" wired or wireless data transmission (e.g. as represented by the lightning bolt) as well as "indirect" communication via other devices (e.g. switches, routers, controllers, computers, etc.) and therefore the example of FIG. 1 should not be considered as limiting.

Computer 110 may include any type of computing platform such as a workstation, a personal computer, a tablet, a "smart phone", one or more servers, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (e.g. computer software program, including program code) stored therein. The control logic, when executed by a processor, causes the processor to perform some or all of the functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many types of networks well known to those of ordinary skill in the art. For example, a network may include a local or wide area network that may employ what is commonly referred to as a TCP/IP protocol suite to communicate. A network may include a worldwide system of interconnected computer networks that is commonly referred to as the internet, or could also include various intranet architectures. Those of ordinary skill in the related art will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As described herein, embodiments of the described invention include a system and method that minimizes the amount of time needed to collect an image by synchronizing the movement of a sample stage to a period that a spectrometer instrument does not actively collect data from a sample. More specifically, the period may include the time associated with either a forward or reverse sweep of an interferometer that may or may not include the time needed for mirror turn around.

Figure 2:
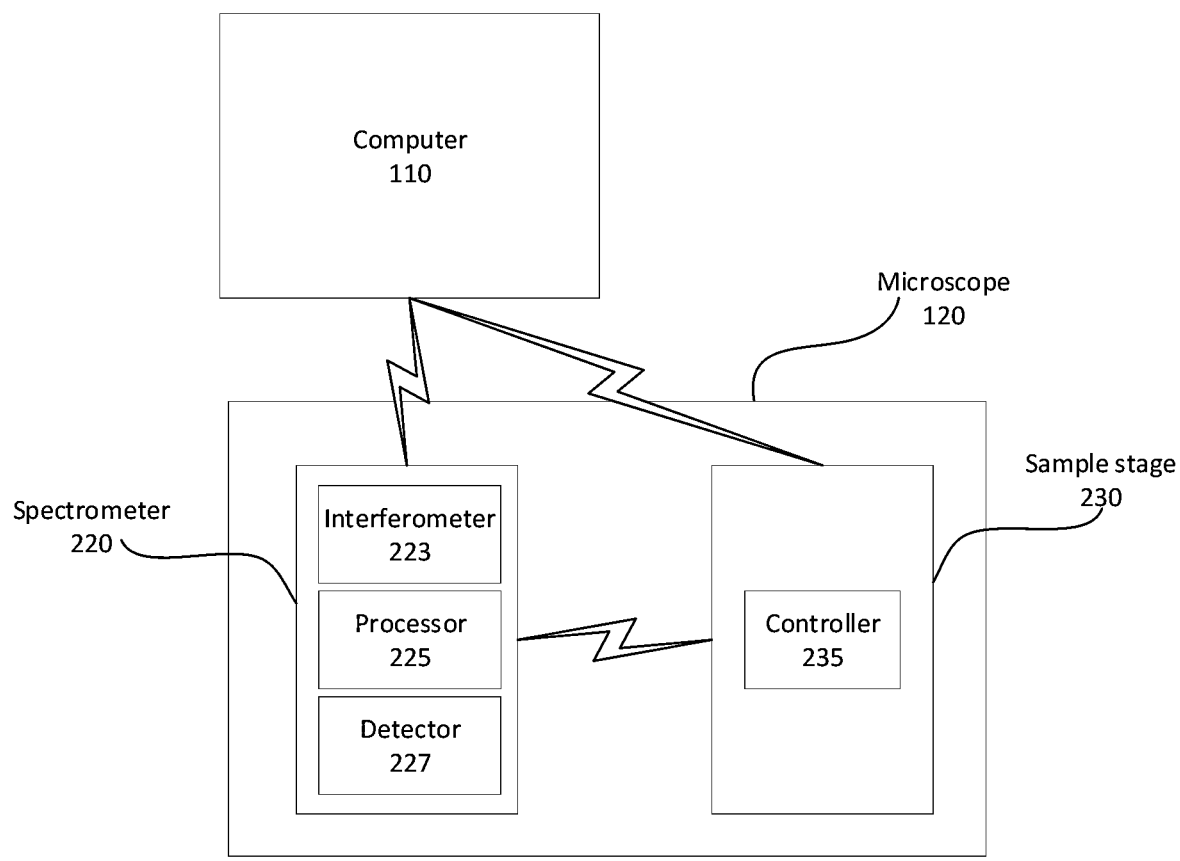
FIG. 2 is a functional block diagram of one embodiment of the microscope instrument of FIG. 1 with a spectrometer and a sample stage.

FIG. 2 provides a simplified illustrative example of microscope 120 of FIG. 1 that includes spectrometer 220 and sample stage 230. It will also be appreciated that in some embodiments spectrometer 220 may be located inside of its own housing operatively coupled to the housing of microscope 120, and thus the example of FIG. 2 should not be considered as limiting. In some embodiments, spectrometer 220 includes interferometer 223 (e.g. a Michelson type interferometer), one or more detectors 227, and processor 225. In some embodiments, the one or more detectors 227 and/or processor 225 may be components of microscope 120 (e.g. located internally or attached externally) rather than incorporated as a component of spectrometer 220.

Interferometer 223 may include what is generally referred to as a Michelson interferometer that is a precise instrument that usually includes a light source (e.g. a laser), a servo control unit, an end plate, a moving mirror, and a beam splitter. The servo control unit may typically use what is referred to as a "zero-crossing" of the laser as a measurement of the velocity of the moving mirror as well as laser signals separated in the plane of the beam to lock the phases of the laser signals in place to some defined phase separation. In the presently described embodiments, the servo control unit may include processor 225, or alternatively it may be an independent element.

The one or more detectors 227 of spectrometer 220 measure spectra from a sample. Examples of detectors 227 may include, but are not limited to what is referred to as a deuterated triglycine sulfate (DTGS) detector, a lithium tantalate (LiTaO3) detector, a triglycine sulfate (TGS) detector, or a mercury cadmium telluride (MCT) detector.

Processor 225 of spectrometer 220 may include any type of processing system known in the art. For example, processor 225 may process the signals detected during a data collection operation that occurs from a sweep (e.g. a forward, and/or a reverse sweep) of interferometer 223. In the presently described example, processor 225 determines whether the data collected from the sweep comprises an acceptable measure of quality that may include successful collection of data using a specified set of parameters. As will be described in further detail below, when processor 225 determines a scan from a sweep comprises an acceptable measure of quality, the processor sends a notification signal to sample stage 230.

In some cases, it may be desirable that spectrometer 220 stops the collection of data from the sample at the point when the notification signal is sent (e.g. via processor 225). Although, it will be appreciated that spectrometer 220 may continue to collect data, such as data related to interferometer performance (e.g. used for quality control). For example, spectrometer 220 may collect data from a sample on a forward sweep and cease the collection of data from the sample on a reverse sweep.

Processor 225 may also send scan data to computer 110 for signal processing, and in some cases perform some degree of pre-processing prior to sending to computer 110.

Sample stage 230 may include any type of stage element known in the art for positioning a sample for spectral analysis. For example, sample stage 230 may be configured for the type of sample to be tested that may include a solid sample, or a fluid sample (e.g. liquid or gas). In the described embodiments, sample stage 230 includes one or more controllers 235 operatively connected to one or more motor elements configured to translate the motion of sample stage 230 in various degrees of freedom (e.g. motion in the X, Y, and or Z axes). For example, the one or more controllers 235 may receive signals from computer 110 that may include a direction and/or degree of movement (e.g. distance) values for sample stage 230 to execute during a movement operation. In some cases, the direction and/or degree of movement values may be defined in an experiment file, user selectable, or other type of definition used in the art.

Controller 235 of sample stage 230 may also include a counter element responsible for incrementing a count value for each notification that indicates the acquisition of a scan of acceptable quality received from spectrometer 220. For example, when the count value reaches a defined number that may be pre-determined by a user selection, experiment file, etc., controller 235 initiates a movement operation of sample stage 230 from a first location to a second location according to the direction and/or degree of movement. In the presently described example, having controller 235 independently track the count of acceptable scans and control movement of sample stage 230 is more efficient than alternative strategies that rely on other elements (e.g. such as spectrometer 220 or computer 110) to perform the tracking and communicate instruction to sample stage 230. Further, when sample stage 230 reaches the second position and is stable (e.g. no further motion, vibrations, etc.), controller 235 sends a notification to spectrometer 220.

Figure 3:
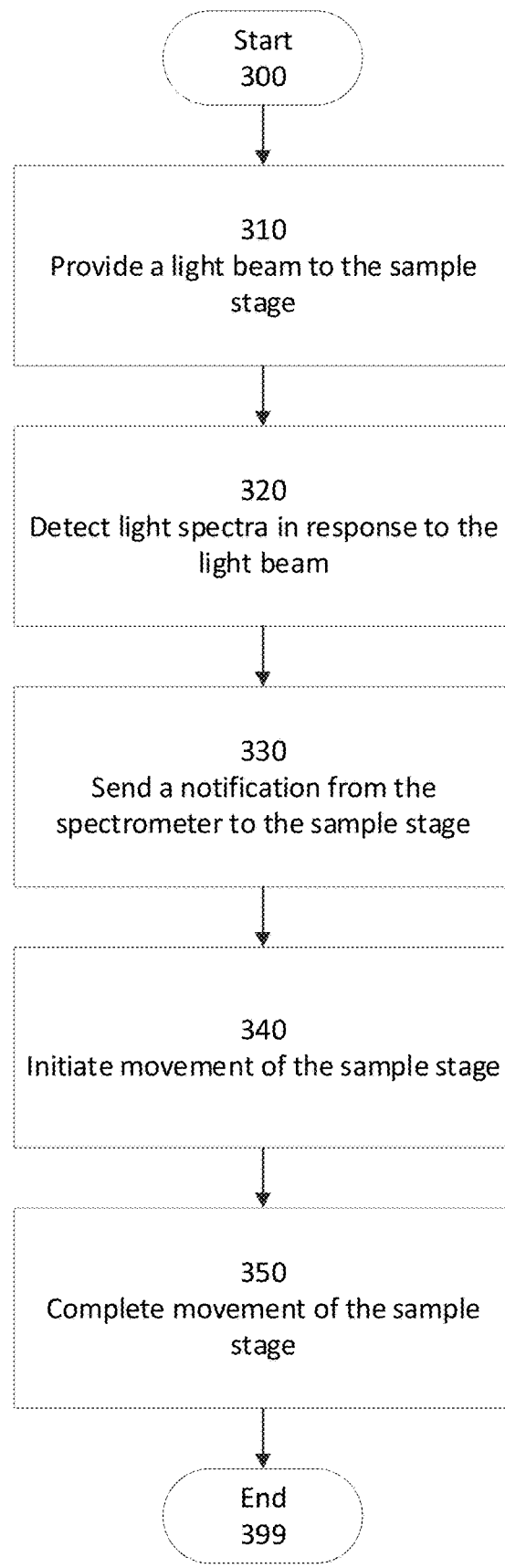
FIG. 3 is a functional block diagram of one embodiment of a method for initiating movement of the sample stage of FIG. 2.

FIG. 3 provides a simplified illustrative example of a method for initiating movement of sample stage 230 of FIG. 2 that begins at step 300 and ends at step 399. In step 310, at the initiation of a scan, interferometer 223 provides a modulated light beam to sample stage 230, and more specifically to a sample positioned on sample stage 230. For example, sample stage may be positioned at an X, Y position to place the sample in a field of view where it is desirable to start an image acquisition process that iterates through a plurality of positions. In some cases, it is desirable that each successive position is adjacent to the position prior to a move in the interest of movement efficiency. However, it will be appreciated that there it may also be advantageous if successive positions are separated by some distance.

Next at step 320, light from sample stage 230 is detected by one or more detectors 227. For example, as described above the detected light is converted to a sequence of digital numbers for the scan that processer 225 evaluates to determine if the scan comprises an acceptable measure of quality. At step 330, when processor 225 determines the scan comprises an acceptable measure of quality, processor 225 sends a notification signal to sample stage 230 (e.g. controller 235). If processor 225 determines that the scan does not comprise an acceptable measure of quality, processor 225 initiates a new scan without sending a notification to sample stage 230.

At step 340, when controller 235 receives the notification from processor 225, it increments a counter value by one. Controller 235 also monitors the counter value, and when the count value reaches a pre-determined number, controller 235 sends a notification signal to spectrometer 220 and initiates a movement operation of sample stage 230. In some case, processor 225 may stop sample collection upon receiving the notification from controller 235.

At step 350, when sample stage 230 has reached a stable state at the new position, controller 235 sends a second notification to spectrometer 220 indicating the movement operation is complete. Upon receiving the second notification, processor 225 begins again at step 310 to initiate a new scan, unless the data for a complete image has been acquired (e.g. as defined in an experiment file) at which point the process is complete.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments

What is claimed is:

1. A microscope system, comprising:
   a sample stage configured to position a sample; and
   a spectrometer comprising an interferometer configured to provide a light beam to the sample stage and one or more detectors configured to detect light spectra in response to the light beam,
   wherein the spectrometer sends a notification to the sample stage after a scan comprising an acceptable measure of quality has been acquired from the detected light spectra at a first location, and the sample stage is further configured to count the notifications and initiate movement of the sample stage to a second location when a count value reaches a pre-determined number.

2. The microscope system of claim 1, wherein:
   the light spectra is detected from a sample disposed on the sample stage.

3. The microscope system of claim 1, wherein:
   the detected light spectra comprises an emission spectra.

4. The microscope system of claim 1, wherein:
the detected light spectra comprises a transmission spectra.

5. The microscope system of claim 1, wherein:
the acceptable measure of quality comprises successful collection of data using a specified set of parameters.

6. The microscope system of claim 1, wherein:
the sample stage is further configured to send a notification to the spectrometer when the count value reaches a pre-determined number.

7. The microscope system of claim 6, wherein:
when the spectrometer receives the notification that the count value has reached the pre-determined number, the spectrometer is configured to stop data collection.

8. The microscope system of claim 1, wherein:
the sample stage is further configured to send a notification to the spectrometer when the sample stage is positioned at the second location.

9. The microscope system of claim 8, wherein:
when the spectrometer receives the notification that the sample stage is positioned at the second location, spectrometer is configured to start data collection.

10. The microscope system of claim 1, wherein:
the movement of the sample stage occurs during a reverse sweep of the interferometer.

11. The microscope system of claim 1, wherein:
the sufficient number of scans is user selectable.

12. A method of moving a sample stage, comprising:
providing a light beam to the sample stage from a spectrometer;
detecting light spectra in response to the light beam using the spectrometer;
sending a notification from the spectrometer to the sample stage after a scan comprising an acceptable measure of quality has been acquired from the detected light spectra at a first location;
counting the notifications, wherein the sample stage counts the notifications; and
initiating movement of the sample stage to a second location when a count value reaches a pre-determined number, wherein the sample stage initiates the movement.

13. The method of moving a sample stage of claim 12, wherein:
the light spectra is detected from a sample disposed on the sample stage.

14. The method of moving a sample stage of claim 12, wherein:
the detected light spectra comprises an emission spectra.

15. The method of moving a sample stage of claim 12, wherein:
the detected light spectra comprises a transmission spectra.

16. The method of moving a sample stage of claim 12, wherein:
the acceptable measure of quality comprises successful collection of data using a specified set of parameters.

17. The method of moving a sample stage of claim 12, wherein:
the sample stage sends a notification to the spectrometer when the count value reaches a pre-determined number.

18. The method of moving a sample stage of claim 17, wherein:
when the spectrometer receives the notification that the count value has reached the pre-determined number, the spectrometer stops data collection.

19. The method of moving a sample stage of claim 12, wherein:
the sample stage sends a notification to the spectrometer when the sample stage is positioned at the second location.

20. The method of moving a sample stage of claim 19, wherein:
when the spectrometer receives the notification that the sample stage is positioned at the second location, spectrometer starts data collection.

21. The method of moving a sample stage of claim 12, wherein:
the movement of the sample stage occurs during a reverse sweep of the interferometer.

22. The method of moving a sample stage of claim 12, wherein:
the sufficient number of scans is user selectable.

* * * * *